United States Patent [19]
Tanaka et al.

[11] Patent Number: 5,545,489
[45] Date of Patent: Aug. 13, 1996

[54] MULTI-LAYER SLIDING BEARING HAVING EXCELLENT FRETTING PROPERTY

[75] Inventors: Tadashi Tanaka, Konan; Masaaki Sakamoto, Nagoya; Koichi Yamamoto, Komaki; Tohru Kato, Seto; Mitsuru Sugita, Inuyama, all of Japan

[73] Assignee: Daido Metal Company Ltd., Nagoya, Japan

[21] Appl. No.: 326,351

[22] Filed: Oct. 20, 1994

Related U.S. Application Data

[63] Continuation of Ser. No. 114,186, Sep. 1, 1993, abandoned.

[30] Foreign Application Priority Data

Sep. 11, 1992 [JP] Japan ................................. 4-243255

[51] Int. Cl.$^6$ .......................... F16C 33/02; B32B 15/04
[52] U.S. Cl. .................... 428/629; 428/632; 428/645; 428/652; 428/654; 428/677
[58] Field of Search .................... 428/628, 629, 428/632, 677, 645, 654, 652, 644

[56] References Cited

U.S. PATENT DOCUMENTS

| | | | |
|---|---|---|---|
| 2,635,020 | 4/1953 | Beebe, Jr. | 428/645 |
| 3,180,008 | 4/1965 | Elderkin et al. | 428/645 |
| 3,899,365 | 8/1975 | Guy | 148/250 |
| 4,103,913 | 8/1978 | McDowell | 277/235 B |
| 4,206,268 | 6/1980 | Roemer et al. | 428/644 |
| 4,562,122 | 12/1985 | Hodes et al. | 428/645 |
| 4,836,695 | 6/1989 | Baureis et al. | 428/653 |
| 4,927,715 | 5/1990 | Mori | 428/645 |
| 5,010,783 | 4/1991 | Sparks et al. | 74/527 |
| 5,185,216 | 2/1993 | Tanaka et al. | 428/645 |
| 5,334,460 | 8/1994 | Tanaka et al. | 428/677 |

FOREIGN PATENT DOCUMENTS

| | | |
|---|---|---|
| 62-110021 | 5/1987 | Japan . |
| 2121120 | 4/1983 | United Kingdom . |
| 2243418 | 4/1991 | United Kingdom . |

*Primary Examiner*—Ngoc-Yen Nguyen
*Attorney, Agent, or Firm*—Browdy and Neimark

[57] ABSTRACT

A multi-layer sliding bearing having an excellent anti-fretting property, comprises a back steel layer, and a bearing alloy layer formed on the back steel layer. A film of phosphate having a thickness of 0.1–15 μm is formed on a back surface of the back steel layer, thereby enhancing the anti-fretting property of the bearing. The provision of the phosphate film well compatible with a mating material overcomes damage to the bearing due to fretting in a high-speed range. Therefore, the bearing can fully exhibit a bearing performance even under severe conditions of use in a high-speed, high-temperature and high-load range as typically experienced in a high-performance engine.

4 Claims, 4 Drawing Sheets

FRETCHING SIMULATION TEST RESULT

FRETCHING SIMULATION TEST RESULT

FIG. 4A
| SIMULATION TEST CONDITION | | |
|---|---|---|
| ITEM | SIZE | UNIT |
| BEARING SIZE | Dia.45×ℓ17×t1.5 | mm |
| CLEARANCE | 0.100 | mm |
| TEST LOAD | 3.5 | Ton |
| TEST WAVE SHAPE | SINE WAVE | — |
| FREQUENCY | 60 | HZ/sec |
| CYCLE NUMBER | 5×10⁶ | TIME |
FIG. 4B
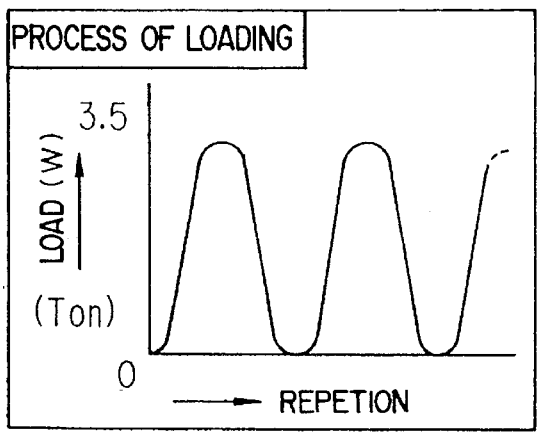
| EVALUTION PROCESS |
|---|
| AFTER CONSTANT LOAD OF SINE WAVE IS REPEATED UP TO A PREDETERMINED TIMES WHILE TENSILS LOAD IS ADDED, A TESTED BEARING IS TAKEN OUT TO EVALUATE THE OUTER FACE THEREOF |
FIG. 4C
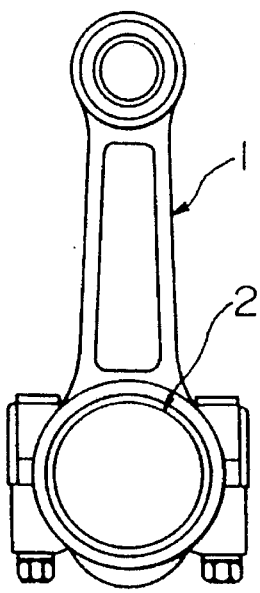
FIG. 4D
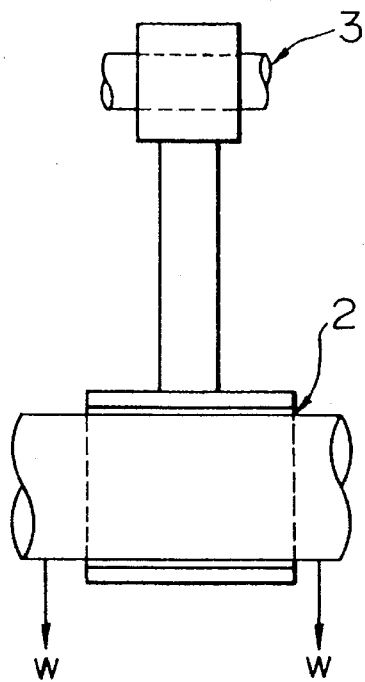

MULTI-LAYER SLIDING BEARING HAVING EXCELLENT FRETTING PROPERTY

This application is a continuation of application Ser. No. 08/114,186, filed Sep. 1, 1993, now abandoned.

FIELD OF THE INVENTION

This invention relates to a multi-layer sliding bearing, and more particularly to a sliding bearing which exhibits excellent bearing properties even under severe conditions of use of a recent internal combustion engine in a high-speed, high-temperature and high-load range, which conditions are due to a compact and lightweight design of the engine for fuel-saving purposes and to a high-performance design of the engine.

BACKGROUND OF THE INVENTION

In one conventional sliding bearing, a bearing alloy layer of an Al—Sn alloy, an Al—Si—Sn alloy, a Cu—Pb alloy or a Cu—Pb—Sn alloy is formed on a surface of a steel support or backing metal. In another conventional sliding bearing, a coating layer is formed on a back surface of a backing metal to cope with fretting.

With a compact and lightweight design of recent internal combustion engines for fuel-saving purposes and also with a high output design thereof, the engine is used at a high temperature, high speed and a high load. Therefore, a close contact of the bearing portion with a housing fails to be maintained, so that damage of the bearing, such as fatigue and seizure due to fretting (which means a surface damage developing when a slight relative motion is periodically repeated between two contact surfaces), has frequently occurred. Particularly with respect to a connecting rod, not only the bearing but also the connecting rod itself may be subjected to fatigue failure. Therefore, whether or not the conventional sliding bearings has an anti-fretting property has become a major problem.

To overcome these problems, it has been proposed to improve the rigidity of the housing, or to increase an interference to enable the bearing to follow the deformation of the housing when mounting the bearing portion, or to form a film of Cu, Ni, Al or an alloy thereof, or a synthetic resin such as PTFE, polyamide and polyethylene, on a back surface of a back metal of the bearing so as to improve its compatibility with its mating material.

SUMMARY OF THE INVENTION

It is an object of this invention to provide a novel multi-layer sliding bearing which is so excellent in anti-fretting property as to meet conditions of use in a high-speed, high-temperature and high-load range, as typically experienced in a high-performance internal combustion engine.

According to the present invention, there is provided a multi-layer sliding bearing having an excellent anti-fretting property, comprising a steel backing layer, and a bearing alloy layer formed on the steel backing layer, the steel backing layer having a film of phosphate formed on its back surface, and the phosphate film having a thickness of 0.1 to 15 μm.

The bearing alloy layer can be composed of an aluminum alloy which is an Al—Sn alloy, an Al—Si—Sn alloy, an Al—Pb alloy, an Al—Si—Pb alloy, an Al—Zn alloy or an Al—Si—Zn alloy.

The bearing alloy layer can be composed of a copper alloy which is a Cu—Pb alloy or a Cu—Pb—Sn alloy.

An overlay layer can be formed on a surface of the bearing alloy layer. The overlay layer is composed of a lead alloy containing at least one kind of 2 to 30 wt. % in total selected from the group consisting of Sn, In, Cu and Sb. Alternatively, the overlay layer is composed of an aluminum alloy containing at least one kind of 2 to 60 wt. % in total selected from the group consisting of Sn, Pb, Cu, Sb and Si.

The phosphate film is composed, for example, of zinc phosphate, calcium zinc phosphate, manganese phosphate or iron phosphate.

The phosphate film has achieved the following effects.

(1) This film prevents a metal-to-metal contact, and exhibits an excellent wear resistance against fine vibrations. (2) Since this film has a suitable porosity, it serves to retain lubricating oil therein, and therefore dampens the contact between the housing and the bearing portion, thereby suppressing the fretting phenomenon. (3) This film reduces the coefficient of friction between the two surfaces to thereby restrain a temperature rise.

If the thickness of the above phosphate film is less than 0.1 μm, a satisfactory effect is not obtained. In contrast, if this thickness is more than 15 μm, the film becomes brittle, and besides the cost is increased.

The friction between two contact surfaces is a phenomenon resulting from all of comformability, a scuffing property and adherability between these two surfaces. Therefore, such respect that the friction coefficient is low means that the comformability between the two surfaces is good, that the scuffing property and the adherability are low, and that the amount of heat produced is small. The inventors of the present invention have found from these that whether or not the anti-fretting property is good can be determined by the value of the friction coefficient.

BRIEF DESCRIPTION OF THE DRAWINGS

FIGS. 4A to 4D are illustrations showing conditions of the fretting simulation test, as well as the manner of conducting this test.

DESCRIPTION OF THE INVENTION

The present invention will now be described more specifically by way of the following Examples:

EXAMPLE 1

In order to compare the relation between a load and a coefficient of friction, test pieces were prepared from a cold-rolled steel sheet (JIS G 3141 SPCC) commonly used widely as a back metal layer of a bearing. The surfaces of the test pieces were treated with respective phosphates to provide samples or test pieces.

Tests were conducted using Suzuki's friction wear test device (which is of the type in which a test piece is fixed whereas a mating material is rotated). An induction-hardened material (JIS S55C) was used as a mating material for the test piece. Oil of 0.1 cc was coated onto the mating material, and a wear test lasting for 4 hours, as well as a starting friction test, was conducted. Conditions of the tests are shown in Table 2, and results of the tests are shown in FIGS. 1 and 2.

Figure 1:
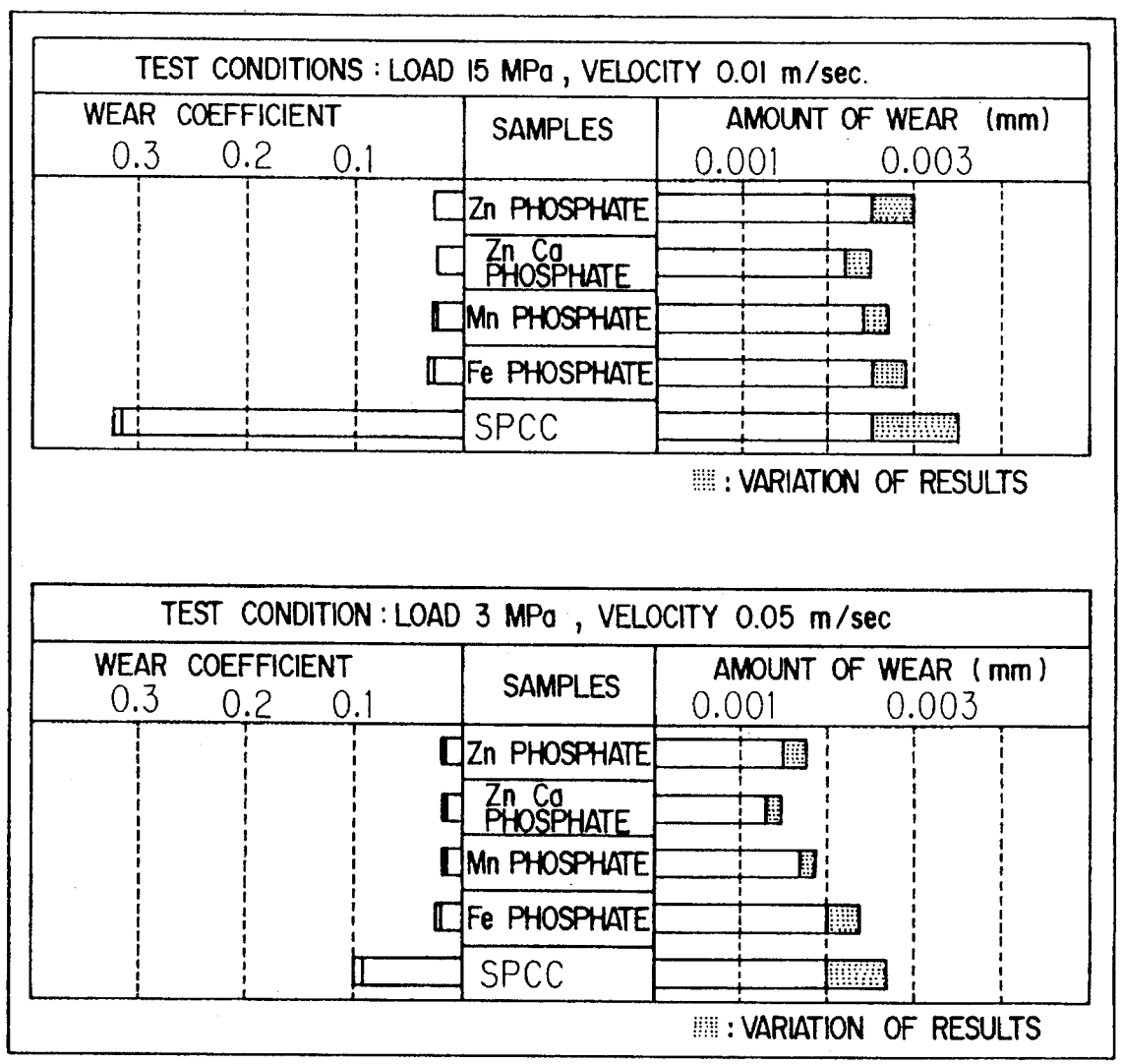
FIG. 1 is a diagram showing results of a wear test of products of the present invention.
Figure 2:
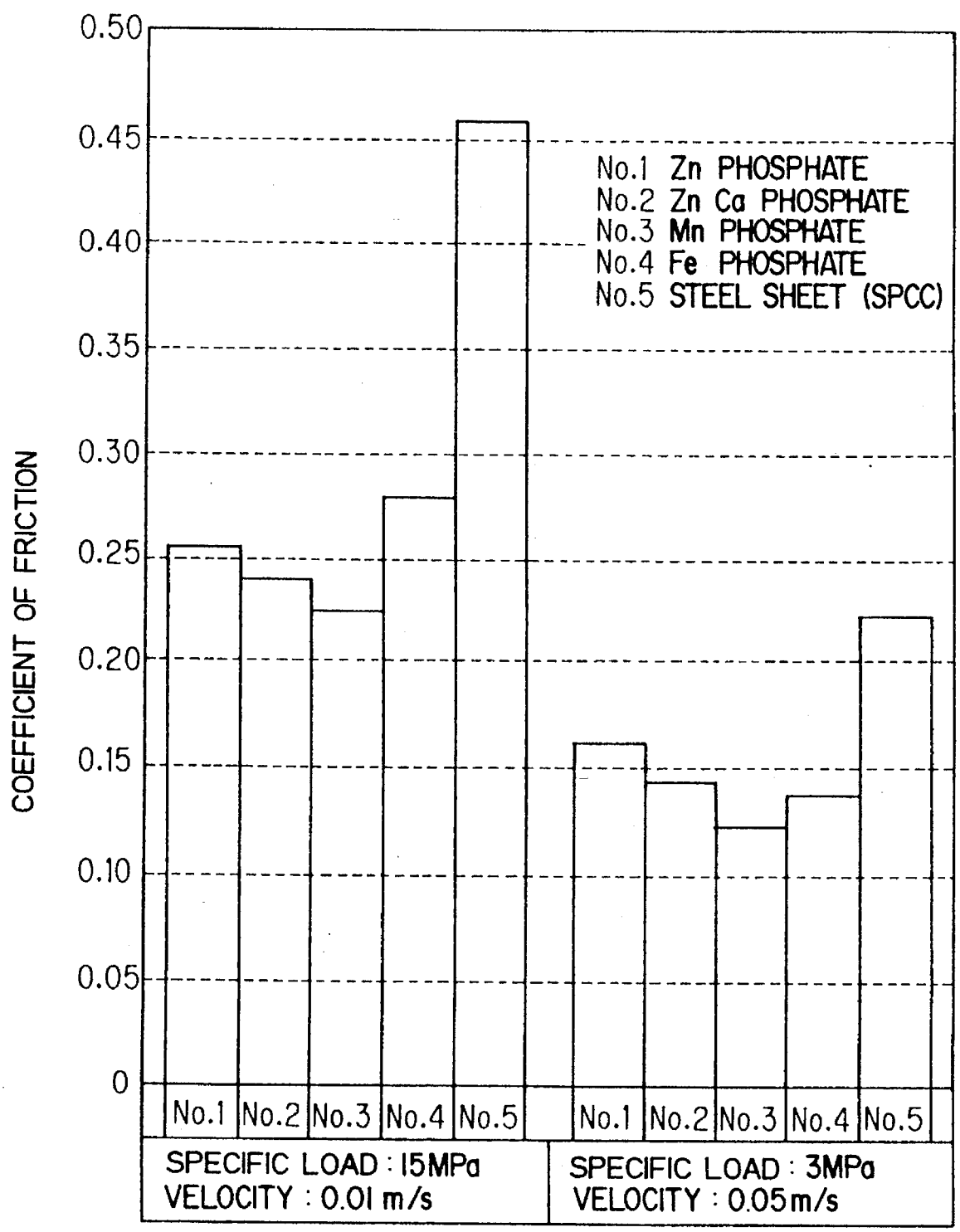
FIG. 2 is a graph showing results of an activation.wear test.

As is clear from FIGS. 1 and 2, all of products of the present invention were lower in friction coefficient, and were superior in wear resistance, as compared with SPCC.

EXAMPLE 2

(a) Powder of a copper-lead alloy and powder of a copper-lead-tin alloy were splayed onto surfaces of respective steel strips plated at their surface with copper. Then, the powder layers deposited respectively on the steel strips were sintered in a reducing atmosphere at temperatures of 700° to 900° C. for 10 to 30 minutes. Then, each of these composite sintered materials was passed between rolls to be rolled, and then was again sintered and rolled to form a bimetal.

(b) An Al—Sn bearing alloy and an Al—Zn—Si bearing alloy were prepared by continuous casting, and then each of the cast alloys was cut at its surfaces, and then was repeatedly rolled and annealed to be finished into an alloy strip of predetermined dimensions. Then, each alloy strip was pressure-bonded directly or through an Al intermediate layer to a back steel strip to provide a bimetal material.

(c) Each of the bimetals prepared in the above Steps (a) and (b) was pressed and machined into a semicircular bearing portion with a width of 17 mm, in which an inner diameter of the bearing was 42 mm, and the thickness of the bearing alloy was 0.3 mm.

(d) A chemical treatment was applied to each of the bearing portions prepared in the above Step (c), and a film of a respective one of various kinds of phosphates, which had a thickness of 2 to 8 μm, was formed on a back surface (the back metal side) of the bearing.

Further, in order to provide test bearings having an overlay on the surface of the bearing alloy layer, a surface layer (overlay) of a Pb alloy was formed by electroplating on the surface of the bearing alloy layer of some of the bearings. Also, a surface layer (overlay) of an Al alloy was formed by sputtering on the surface of the bearing alloy layer of some of the bearings. Each overlay had a thickness of 20 μm. The various kinds of test bearings are shown in Table 1.

In order to confirm the effect (anti-fretting property) of the phosphate film, a comparison test was conducted using an electric-hydraulic fatigue test device.

Figure 3:
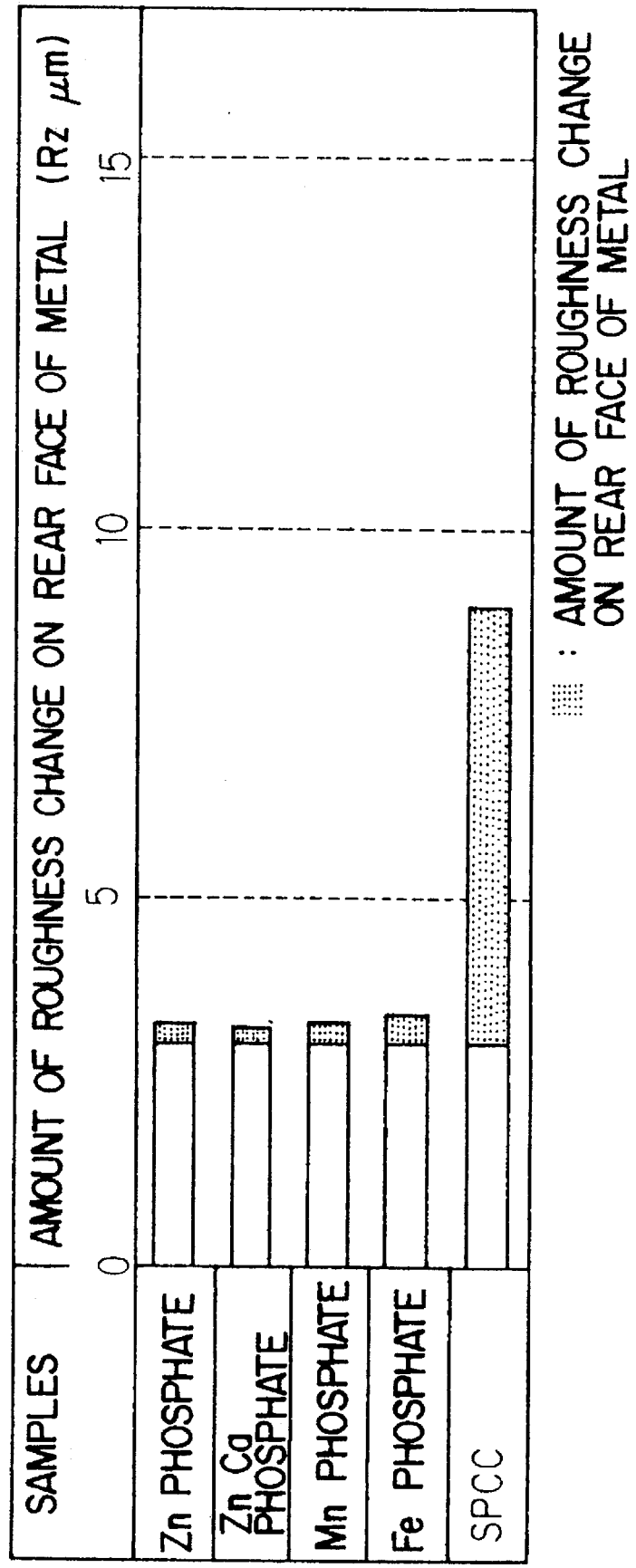
FIG. 3 is graph showing results of a fretting simulation test.

In the test, the bearing was attached to a connecting rod 1 (which was formed by forging steel, and its inner peripheral surface had a surface roughness of 6.3 μm) mounted on a fixed shaft 3, and a dynamic tensile load (W) applied by oil pressure was repeatedly applied to carry out a fretting simulation test, and the amount of change of roughness of the back surface of the bearing (2) due to the fretting was observed for comparison purposes. The condition of the back surface is shown in Table 1. The conditions of this test are shown in FIGS. 4A to 4D, and results of this test are shown in FIG. 3. Here, such a respect that the amount of change of roughness of the back surface of the back metal is small means that the amount of wear is small, and therefore means that it has an excellent anti-fretting property.

It will be clearly appreciated from FIG. 3 that all of the products of the present invention are smaller in the amount of change of roughness than the conventional product, and therefore are excellent in anti-fretting property.

As is clear from the test results in Table 1 and FIGS. 1 to 3, all of the sliding bearings of the present invention are superior in anti-fretting property to the conventional products, and can fully exhibit a bearing performance without damage due to the fretting even under severe conditions of use at high speed, high rotation speed, a high load and so on, as typically experienced in a recent high-performance engine.

TABLE 1

Kind of test bearings and bearing damage

| Kind | Sample No. | Phosphate film on bearing back surface | Bearing alloy layer (wt %) | Overlay layer (wt %) | Damage to bearing back surface (fretting)* |
|---|---|---|---|---|---|
| Products of invention | 1 | zinc phosphate | Cu—25Pb | Pb—10Sn | none |
| | 2 | manganese phosphate | Cu—25Pb | Pb—10Sn | none |
| | 3 | calcium zinc phosphate | Cu—25Pb | Al—20Sn | none |
| | 4 | iron phosphate | Cu—25Pb | Al—20Sn | none |
| | 5 | zinc phosphate | Cu—1.5Sn—23Pb | Pb—10Sn | none |
| | 6 | manganese phosphate | Cu—1.5Sn—23Pb | Pb—10Sn | none |
| | 7 | calcium zinc phosphate | Cu—1.5Sn—23Pb | Al—20Sn | none |
| | 8 | iron phosphate | Cu—1.5Sn—23Pb | Al—20Sn | none |
| | 9 | zinc phosphate | Al—20Sn—1Cu | none | none |
| | 10 | manganese phosphate | Al—20Sn—1Cu | none | none |
| | 11 | calcium zinc phosphate | Al—20Sn—1Cu | none | none |
| | 12 | iron phosphate | Al—20Sn—1Cu | none | none |
| | 13 | zinc phosphate | Al—4Zn—3Si—1Cu—1Pb | Pb—10Sn | none |
| | 14 | manganese phosphate | Al—4Zn—3Si—1Cu—1Pb | Pb—10Sn | none |
| | 15 | calcium zinc phosphate | Al—4Zn—3Si—1Cu—1Pb | Al—20Sn | none |
| | 16 | iron phosphate | Al—4Zn—3Si—1Cu—1Pb | Al—20Sn | none |
| Conventional products | 17 | none | Cu—25Pb | Pb—10Sn | *occurred |
| | 18 | none | Cu—1.5Sn—23Pb | Pb—10Sn | *occurred |
| | 19 | none | Al—20Sn—1Cu | none | *occurred |
| | 20 | none | Al—4Zn—3Si—1Cu—1Pb | Pb—10Sn | *occurred |

*"Damage to bearing back surface occurred" means that fine pits and projections developed at the surface of the back metal.

TABLE 2

| | Conditions of Suzuki's test | |
|---|---|---|
| Items | Wear test | Starting · friction test |
| Specific load | 3 & 15 MPa | 3 & 15 MPa |
| Speed | 0.01 & 0.05 m/s | 0.01 & 0.05 m/s |
| Time | 4 Hr | 30 sec. for each of activation and stop. Repeated 10 times. |
| Temperature | Natural temperature | Natural temperature |
| Lubrication | SAE 30 of 0.1 ml was coated at the time of assembling | SAE 30 of 0.1 ml was coated at the time of assembling |
| Material | S55C | S55C |
| Hardness of mating material | Hv 500–600 | Hv 500–600 |
| Roughness of mating materiall | Rmax 1 μm | Rmax 1 μm |

What is claimed is:

1. A multi-layer sliding bearing having an excellent anti-fretting property, consisting of:

a steel backing layer having a back surface with a single film of phosphate bonded onto said back surface of said steel backing layer, said phosphate film being composed of zinc phosphate, calcium zinc phosphate, manganese phosphate or iron phosphate and having a thickness of 0.1 to 15 μm;

a bearing alloy layer formed on the other surface of the steel backing layer, said bearing alloy layer being composed of an aluminum alloy which is an Al—Sn alloy, an Al—Si—Sn alloy, an Al—Pb alloy, an Al—Si—Sb alloy, an Al—Zn alloy or an Al—Si—Zn alloy, or a copper alloy which is a Cu—Pb alloy or a Cu—Pb—Sn alloy;

and an overlay layer formed on the bearing alloy layer, said overlay being made of aluminum alloy or lead alloy.

2. A multi-layer sliding bearing according to claim 1, in which said overlay layer is composed of a lead alloy containing at least one member selected from the group consisting of Sn, In, Cu and Sb in a total aggregate amount of 2 to 30 wt. %.

3. A multi-layer sliding bearing according to claim 1, in which said overlay layer is composed of an aluminum alloy containing at least one member selected from the group consisting of Sn, Pb, Cu, Sb and Si in a total aggregate amount of 2 to 60 wt. %.

4. A multi-layer sliding bearing having an excellent anti-fretting property, consisting of:

a steel backing layer having a back surface with a single film of phosphate bonded onto said back surface of said steel backing layer, said phosphate film being composed of zinc phosphate, calcium zinc phosphate, manganese phosphate or iron phosphate and having a thickness of 0.1 to 15 μm;

a bearing alloy layer formed on the other surface of the steel backing layer, said bearing alloy layer being composed of an aluminum alloy which is an Al—Sn alloy, an Al—Si—Sn alloy, an Al—Pb alloy, an Al—Si—Sb alloy, an Al—Zn alloy or an Al—Si—Zn alloy, or a copper alloy which is a Cu—Pb alloy or a Cu—Pb—Sn alloy.

* * * * *